Figure 1:
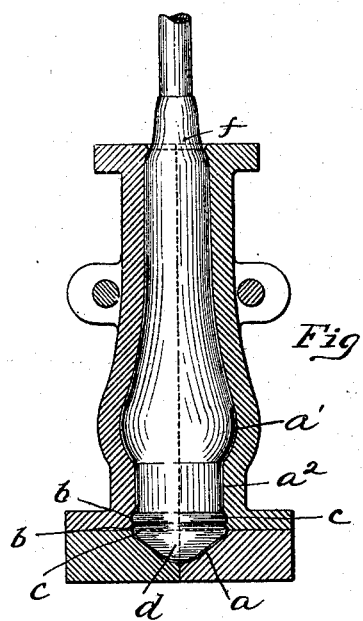

No. 625,065. Patented May 16, 1899.
C. Z. F. ROTT.
CRACKING OFF TUBULAR GLASSWARE.
(Application filed Feb. 9, 1899.)

(No Model.) 2 Sheets—Sheet 1.

Witnesses:
N. Tamarist
Lindsay D. B. Little

Inventor:
Christian Z. F. Rott
By Kay & Totten
Attorneys.

THE NORRIS PETERS CO., PHOTO-LITHO., WASHINGTON, D. C.

No. 625,065. Patented May 16, 1899.
C. Z. F. ROTT.
CRACKING OFF TUBULAR GLASSWARE.
(Application filed Feb. 9, 1899.)
(No Model.) 2 Sheets—Sheet 2.
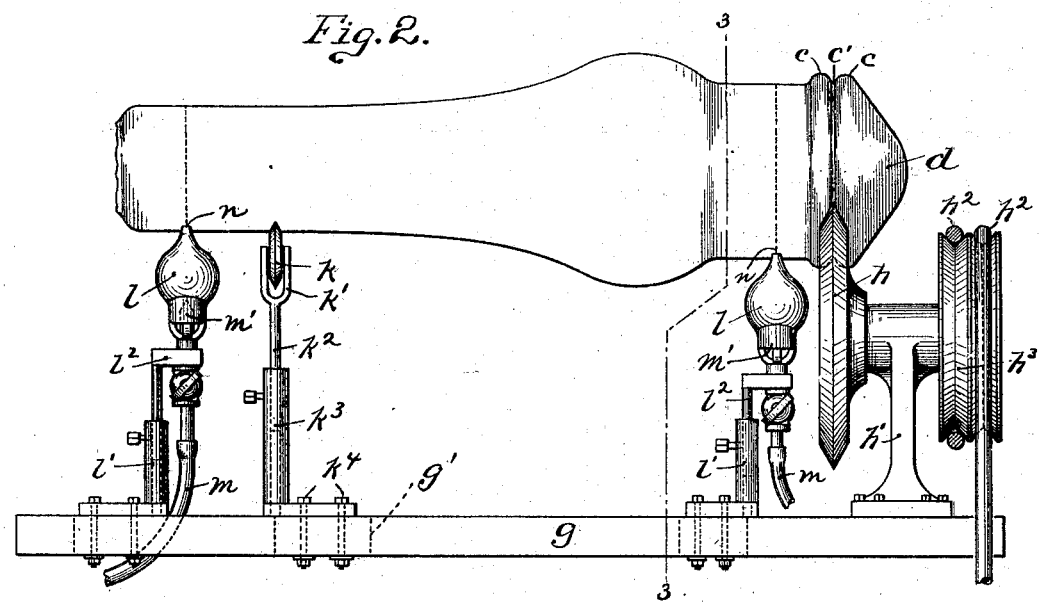
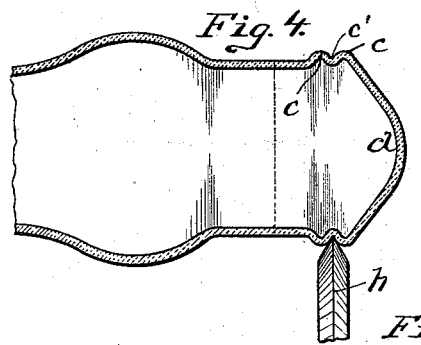
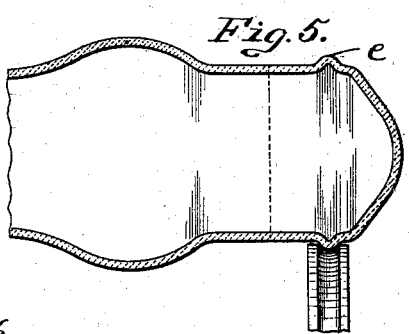
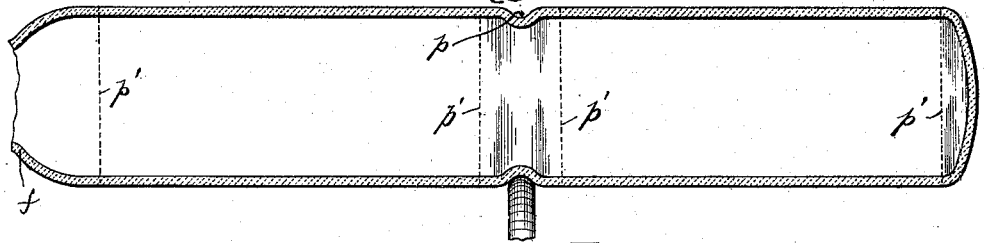
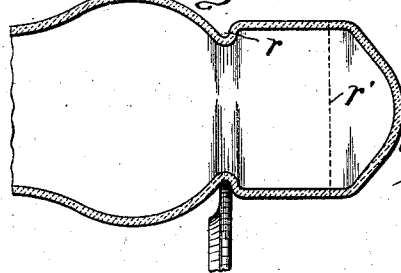
Witnesses:
Inventor:
Christian Z. F. Rott
By Kay & Totten
Attorneys.

UNITED STATES PATENT OFFICE.

CHRISTIAN Z. F. ROTT, OF PITTSBURG, PENNSYLVANIA.

CRACKING OFF TUBULAR GLASSWARE.

SPECIFICATION forming part of Letters Patent No. 625,065, dated May 16, 1899.

Application filed February 9, 1899. Serial No. 705,110. (No model.)

*To all whom it may concern:*

Be it known that I, CHRISTIAN Z. F. ROTT, a resident of Pittsburg, in the county of Allegheny and State of Pennsylvania, have invented a new and useful Improvement in Cracking Off Tubular Glassware; and I do hereby declare the following to be a full, clear, and exact description thereof.

My invention relates to the manufacture of lamp-chimneys, tumblers, and similar hollow glass articles.

Lamp-chimneys are usually formed by blowing, and the chimneys which are blown in molds are blown first in the shape of chimney-blanks, the blanks being of greater length than the chimney or chimneys to be formed and having at one end a solid or closed bottom portion which must be cut or cracked off, while the other end, where the "blow-over" is formed, is also made longer than the chimney-body, and this must also be removed. Other articles are made in like manner, such as tumblers, which are made by pressing or blowing, the thin variety of tumbler being usually formed by blowing, and it being necessary to crack off the upper end of the same to bring the tumbler to the desired length. To remove the end or ends of the articles, the cheapest and most efficient way found has been to heat a thin portion or section of the same extending around the article by means of a thin gas-jet, an electric current, or other similar means, and when such "line," as it might be termed, is heated to touch the chimney at that point with a cold surface, such as a damp cloth, which causes quick contraction, and thereby cracks the chimney around its entire body. Other like means for cutting off have been employed; but though different ways of heating have been used the general principle of cracking off, as above described, has been found the most desirable. For cracking off chimneys a rotating frame has generally been employed, on which the chimney was placed and turned slowly as it was heated by friction, by gas-jet, or by an electric wire, so as to heat and expand the glass at the points desired. With short articles, such as tumblers, the article has been placed in vertical position and a thin horizontal flame projected against it. In the making of these articles the usual custom has been to locate the position of the articles to be cracked off by means of the closed bottom thereof and to depend only on this bottom as the guide in placing the article on the cracking-off machine or in guiding it if it be held vertically into line with the heating-flame used in cracking off. In either case the guide for the position of the article to be cracked off has been the solid glass base, which, though a fair guide, was liable to disturbance either on account of the heat of the article when taken from the mold, such as where a heavy base was formed, which changed its shape before the blank was cool, or where such base when still plastic was struck by any object which changed its shape, and in both cases the guide so obtained was not reliable, while with lamp-chimneys and like long articles it was necessary to place them at a slight incline on the cracking-off machine to hold them against the guide contacting with the closed end, and this in some cases prevented as even rotation of the article as desirable.

The object of the present invention is to provide for the formation of the chimney, so that in the blowing of the same a more perfect guiding means is provided upon the blank, which can always be depended upon to bring the chimney into exact position, and thereby insures the cracking off of the chimneys at proper positions with relation to the bulbs or enlargements found thereon.

To this end my invention consists, generally stated, in forming a hollow chimney or like blank with an annular guide extending around the body of the blank, preferably outside of the part used to form the chimney, and during the cracking or cutting off rotating the chimney with a guide engaging with the annular guide on the chimney and so bringing the chimney to exact position desired.

It also consists in a chimney or like blank having the annular guide formed around the body portion of the blank and outside of the part thereof to form the finished article.

It also consists in certain other improvements, to be hereinafter more fully set forth and claimed.

To enable others skilled in the art to practice my invention, I will describe the same more fully, referring to the accompanying drawings, in which—

Figure 3:
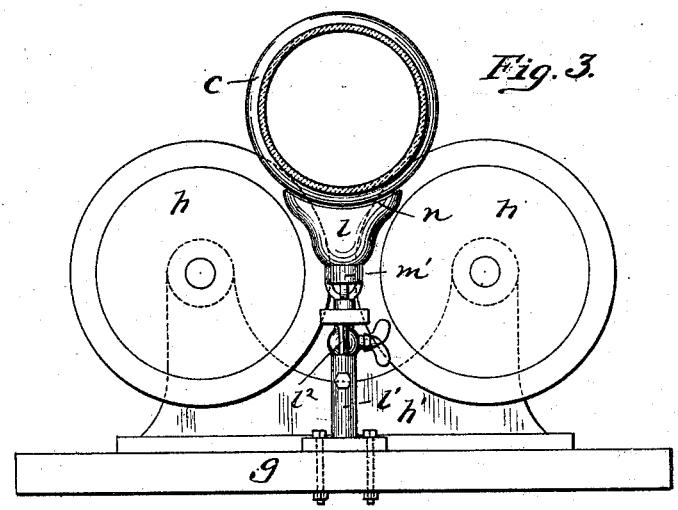
Figure 8:
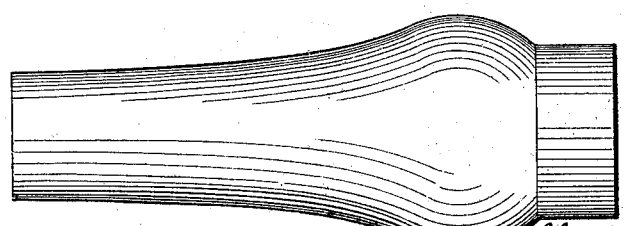

Figure 1 is a vertical section of the mold for blowing the chimney or like blank, showing the blank as blown within the mold. Fig. 2 is a side view of a suitable cracking-off machine to be employed in connection with the blank. Fig. 3 is a sectional view on the line 3 3, Fig. 2, showing the position of the burner and the supporting and guiding rollers for the chimney during cracking off. Figs. 4, 5, 6, and 7 illustrate blanks having different shapes of guides formed around them together with the guiding-rolls of proper form to engage with such guides, and Fig. 8 illustrates a completed chimney as so formed.

Like letters indicate like parts in each of the figures.

As the invention is especially applicable to the making of lamp-chimneys, and especially such classes of lamp-chimneys as have bulbs or enlargements thereon and where to bring the flame to the proper position within the bulb it is particularly desirable to crack off such chimneys at points which will give accurate lengths of base and bodies to such chimneys, I have illustrated the invention in connection with the formation of the same. The glass-molds employed for forming the chimneys are of course of various shapes, according to the chimneys to be produced.

In the drawings the glass-mold illustrated is a simple partible paste mold having the base-cavity $a$, bulb-cavity $a'$, and neck-cavity $a^2$, and these cavities are of the usual shape employed for a chimney of this character, except that in the base-cavity, below the part which forms the base of the chimney proper, is formed either one or more annular depressions or an annular projecting groove or other like means for producing an annular guide around the body of the chimney, the matrix of the mold of course being the opposite in shape to the guide to be formed. For example, in Fig. 1 the mold has the grooves $b$ $b$, which form on the chimney-blank the annular guiding-beads $c$ $c$, just above the closed chimney-bottom or end portion $d$, such two beads forming a groove $c'$ between them, which is an efficient form of guiding means; but, as shown in Fig. 5, the guide may be formed of a single bead $e$, with which a grooved roll engages, or, as shown in Fig. 6, may be formed of a single groove in the chimney-blank, with which a tongued roll engages, and the glass mold will of course be formed properly to produce such beads or grooves as desired.

In Fig. 6 a single guiding-groove $p$ is formed about midway of the blank from which two separate chimneys are to be formed by cracking off at the points $p'$, while in Fig. 7 one of the regular annular depressions $r$, formed in the body of the chimney—such, for example, as in a student or like chimney—performs the function of the guide in cracking off the chimney, the rear end of which is cracked off at the point $r'$.

The glass blank is blown within the mold in the usual way either by hand or by machinery, and as blown has in addition to the main body a closed base, above described, and the blow-over or neck portion $f$, which must also be cut off to produce the finished chimney, such as shown in Fig. 6. I have also illustrated in the drawings a simple form of cracking-off machine suitable for this purpose in which a thin gas-flame is employed as the heating means for cutting or cracking off, it being understood that any suitable means for accomplishing this result or for rotating the chimney-body may be employed. In said machine the chimney is so placed that a suitable guide will engage with the annular guide groove or bead on the chimney-body and hold it in proper line as it is rotated, and it is preferred to employ a roll traveling in such guide which will at the same time impart the necessary rotation to the chimney so as to turn it while close to the burner, and so expose it to the thin or narrow flame projecting from the burner against the chimney-body. The machine shown in the drawings has the base $g$ provided at one end with the bearing $h'$, in which are mounted the guide-wheels $h$, these wheels being rotated within such bearing $h'$ in any suitable way, such as by the belts $h^2$ passing around the grooved pulleys $h^3$, carried on the guide-wheel shafts, the guide-wheels $h$ fitting within the groove $c'$ of the chimney-blank, the annular beads $c$ fitting on each side of the guide-wheels, and the chimney being thus guided to exact position and also rotated by the turning of the guide-wheels. The other end of the chimney is supported on suitable idle rollers or wheels $k$, two of such wheels being carried in bearings $k'$ upon the standard $k^2$, which is adjustable in the bracket $k^3$, said bracket being longitudinally adjustable on the base $g$ in any suitable way—such, for example, as by means of the slot $g'$, within which clamping-bolts $k^4$ on the bracket $k^3$ fit. The idle-rollers, with their frame, are made vertically and longitudinally adjustable, so that the machine can be arranged for any size or diameter of chimney, the driven guide-wheels always remaining in the same position. In order to heat the chimney when supported in this way, any suitable form of heating means may be employed, that shown being the burners $l$, supported in brackets $l'$, which are longitudinally adjustable on the base $g$, the burners being vertically adjustable in said brackets by means of standards $l^2$. Gas is carried to said burners by any suitable flexible pipes $m$, and the burners have suitable mixing-chambers $m'$, while their upper edges are preferably made corresponding to the curve of the body of the chimney, as shown, and they have extending along the same a fine slit or jet-orifice $n$, which permits of the escape of a very thin bright flame, this flame striking against the glass blank when supported upon the rollers. In this way the burners may be adjusted to the exact position desired in connection with the guide-rollers $h$, so as to heat the chimneys in concentric circles—one near the base and one near the neck—to provide for cracking off to the exact lengths desired with relation to the bulb or main body of the chimney. In case different forms of guiding beads or grooves—such as illustrated in Figs. 5, 6, and 7—are employed, the driving-rolls $h$ have their edges formed to correspond with the same, as fully shown in those figures.

In employing my invention in the manufacture of lamp-chimneys the chimney is blown by the operator by gathering the glass upon the blowpipe, marvering the same, and at the proper time inserting it within the glass-mold and blowing it, the blank being turned during the blowing operation to wipe off any fin. In this blowing operation the annular guiding beads or grooves will be formed upon the chimney-blank outside of the portions to produce the chimney-body, and as soon as the blank is properly cooled and annealed, if that be necessary, it is taken to the cracking-off machine and is placed upon the same, being brought to the desired position by the guiding-beads on the blank in connection with the guide-wheel of the machine, and when in this position is subjected to the gas-flame from the burners $l$, and as quickly as these flames heat and expand the glass in the thin line extending around the chimney-blank the operator touches the blanks in line with such heated zones with a damp cloth or other cold body, which causes quick contraction at those points and leads to the cracking off of the chimneys. In so doing he is always assured of the chimney being cracked off at the proper points, having a positive guiding means in the body of the chimney which is not liable to be disturbed subsequent to the formation of the same while the glass is in plastic condition. At the same time the glass blank can be held in absolutely horizontal position on the supporting rolls or wheels, which prevents any irregular movement of the same when it is rotated, and a more even cracking off of the article is therefore obtained. On account of the perfect guiding of the blanks to place the work, which is usually performed by boys or girls, can be more quickly performed and by less skilled labor and the cost of cracking off therefore reduced.

While I have illustrated the invention in connection with lamp-chimneys, with which it is particularly applicable, it is to be understood that it may be employed with any other form of hollow cylindrical glassware to which it is applicable, and the same is included within the claims.

What I claim as my invention, and desire to secure by Letters Patent, is—

1. The herein-described method of forming lamp-chimneys or like hollow articles, consisting in forming a hollow cylindrical blank with an annular guide extending around the body portion thereof and guiding the blank by the same as it is rotated for cutting or cracking off the end or ends thereof.

2. The herein-described method of forming lamp-chimneys or like hollow articles, consisting in forming a hollow cylindrical blank with an annular projecting bead extending around the body portion thereof and guiding the blank by the same as it is rotated for cutting or cracking off the end or ends thereof.

3. The herein-described method of forming lamp-chimneys or like hollow articles, consisting in forming a hollow cylindrical blank with an annular guide extending around the body portion of the blank outside of the part to be used in forming the finished article and guiding the blank by the same as it is rotated for cutting or cracking off the end or ends thereof.

4. A hollow cylindrical glass blank for forming chimneys or like hollow articles having an annular guide formed on the body thereof to guide its movement in cutting or cracking off, substantially as set forth.

5. A hollow cylindrical glass blank for forming chimneys or like hollow articles having an annular guide formed on the body thereof outside of the portion forming the finished article to guide its movement in cutting or cracking off, substantially as set forth.

In testimony whereof I, the said CHRISTIAN Z. F. ROTT, have hereunto set my hand.

CHRISTIAN Z. F. ROTT.

Witnesses:
 H. P. FULLER,
 ROBERT C. TOTTEN.